Mar. 13, 1923.

G. P. FERRELL.
TYPOGRAPHICAL METHOD AND APPARATUS.
FILED MAY 16, 1921.

Inventor:
Garland P. Ferrell,
by Shepard & Shepard
his Attys.

Patented Mar. 13, 1923.

1,448,621

UNITED STATES PATENT OFFICE.

GEORGE A. FLETCHER, OF BRAZIL, INDIANA.

PIPE-OPERATING DEVICE.

Application filed July 26, 1920. Serial No. 398,853.

*To all whom it may concern:*

Be it known that I, GEORGE A. FLETCHER, a citizen of the United States, residing at Brazil, in the county of Clay and State of Indiana, have invented new and useful Improvements in Pipe-Operating Devices, of which the following in a specification.

This invention relates to a new improved mechanism for placing iron, lead or other pipes, or wire under streets, railroads or elsewhere with the minimum amount of trenching.

An object of the invention is to provide mechanism operating in a novel manner to push or pull a service pipe into place within the earth.

A further object of my invention is to provide a machine or apparatus that operates in such a manner that a pavement or other structure will not be interfered with when placing the pipes or wire into place within the earth.

A feature of the invention is the novel manner of constructing and arranging the parts so that this apparatus will withstand the necessary strain to accomplish the foregoing results.

With these and other objects in view the invention will be better understood from the following detailed description taken in connection with the accompanying drawing wherein:

Fig. 1 is a vertical sectional view.

Fig. 2 is a cross sectional view on line 2—2 Fig. 1.

Again referring to the drawing illustrating one construction of my invention the numeral 1 designates a stationary rack secured to a solid foundation in any suitable manner. This rack, which is slidably engaged by a bracket 2, consists of companion members 3 and 4 bolted together as indicated at 5. Rotatably supported between the member is a segmental gear 6 and an operating gear 7 that has a socket 8 for receiving an operating handle or lever. Gear 6 is provided with arcuate recesses 9 and 10 receiving the cylindrical extensions 11 on the pair of companion pawls 12 and 13. It will be noted that the pawls are of such a length and associated in such a manner that they will alternately engage the teeth of the rack so that in the operation of the apparatus the bracket may be moved along the rack bar with great power so that the pipes or wires connected to the pin 14 may be forcibly moved into place. Connected to the pawl 13 is a handle 15 for disengaging the same from the rack bar.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A pipe operating device comprising a rack bar, a bracket slidably supported by the rack bar, a segmental gear rotatably supported by the bracket and formed at opposite sides of its pivot with a pair of sockets, a pair of pawls each having one end shaped to rotatably fit within a socket and adapted to alternately engage and operate said rack, a handle swingingly connected to the bracket and having a segmental gear portion engaging said segmental gear.

2. A pipe operating device comprising a rack bar, a bracket slidably supported by the rack bar, a segmental gear rotatably supported by the bracket and formed at opposite sides of its pivot with a pair of sockets, a pair of pawls each having one end shaped to rotatably fit within a socket and adapted to alternately operate said bracket, a handle swingingly connected to the bracket and having a segmental gear portion engaging said segmental gear, and a finger piece projecting from one of the pawls whereby the rack bar may be released.

3. A pipe operating device comprising a stationary rack bar, a bracket slidably mounted on the rack bar, a segmental gear mounted on the bracket and having arcuate recesses one above and one below the pivot of said gear, pawls cooperating with the rack and each having a cylindrical extension mounted in one of the recesses, and an operating gear cooperating with the said first mentioned gear.

In testimony whereof I affix my signature.

GEORGE A. FLETCHER.